United States Patent
Gonzalez Alvarez et al.

(10) Patent No.: US 12,110,048 B2
(45) Date of Patent: Oct. 8, 2024

(54) METHOD FOR IN-SITU AND REAL-TIME COLLECTION AND PROCESSING OF GEOMETRIC PARAMETERS OF RAILWAY LINES

(71) Applicant: TELEFONOS, LINEAS Y CENTRALES, S.A., Alcobendas (ES)

(72) Inventors: Cesareo Gonzalez Alvarez, Alcobendas (ES); Ruben Puente Martinez, Alcobendas (ES); Adrian Suarez Gonzalez, Alcobendas (ES); Dario Gallach Perez, Alcobendas (ES); Borja Javier Lanza Lopez, Alcobendas (ES)

(73) Assignee: TELEFONOS, LINEAS Y CENTRALES, S.A., Alcobendas (ES)

( * ) Notice: Subject to any disclaimer, the term of this patent is extended or adjusted under 35 U.S.C. 154(b) by 274 days.

(21) Appl. No.: 17/756,502

(22) PCT Filed: Dec. 17, 2019

(86) PCT No.: PCT/ES2019/070857
§ 371 (c)(1),
(2) Date: May 26, 2022

(87) PCT Pub. No.: WO2021/123463
PCT Pub. Date: Jun. 24, 2021

(65) Prior Publication Data
US 2022/0410949 A1    Dec. 29, 2022

(51) Int. Cl.
*B61L 23/04* (2006.01)
*B61L 27/53* (2022.01)
(Continued)

(52) U.S. Cl.
CPC ............. *B61L 23/041* (2013.01); *B61L 27/53* (2022.01); *G01S 7/4808* (2013.01); *G01S 17/89* (2013.01);
(Continued)

(58) Field of Classification Search
None
See application file for complete search history.

(56) References Cited

U.S. PATENT DOCUMENTS

| | | | |
|---|---|---|---|
| 2017/0066459 A1* | 3/2017 | Singh | H04N 23/90 |
| 2022/0126887 A1* | 4/2022 | Gonzalez Alvarez | B60M 1/28 |

(Continued)

FOREIGN PATENT DOCUMENTS

| | | | |
|---|---|---|---|
| CN | 201126354 Y | * | 10/2008 |
| CN | 102628674 A | * | 8/2012 |

(Continued)

OTHER PUBLICATIONS

Mostafa Arastounia, "Automated Recognition of Railroad Infrastructure in Rural Areas from LIDAR Data", Remote Sens. 2015, vol. 7, No. 11, pp. 14916-14938.

(Continued)

*Primary Examiner* — Kevin R Steckbauer
(74) *Attorney, Agent, or Firm* — LUCAS & MERCANTI, LLP

(57) ABSTRACT

A method for in-situ and real-time collection and processing of geometric parameters of railway lines, in a particular but non-limiting manner to those related to the height and stagger of the contact wire in electrified lines and the gauges to specific elements of the infrastructure in any line, generated based on static measurements starting from two-dimensional scenes perpendicular to the track axis, by determining the number of angular positions per scene, determining the minimum number of passes in each position, obtaining the (Continued)

raw coordinates, applying an averaging algorithm, applying offset corrections, transforming coordinates and applying either the steps to salve for height and stagger of the overhead contact line, or applying the steps to salve for gauges to specific elements of the infrastructure. An optimized, efficient and simple method is achieved which enables the real-time management and processing of the data obtained from the railway infrastructure.

7 Claims, 3 Drawing Sheets

(51) Int. Cl.
    *G01S 7/48*     (2006.01)
    *G01S 17/89*     (2020.01)
    *G06T 7/00*     (2017.01)

(52) U.S. Cl.
    CPC .. *G06T 7/0004* (2013.01); *G06T 2207/10028* (2013.01); *G06T 2207/30184* (2013.01)

(56) References Cited

U.S. PATENT DOCUMENTS

| | | | | |
|---|---|---|---|---|
| 2022/0306169 | A1* | 9/2022 | Wang | B61K 9/08 |
| 2022/0410949 | A1* | 12/2022 | Gonzalez Alvarez | G01S 17/88 |

FOREIGN PATENT DOCUMENTS

| | | | | | |
|---|---|---|---|---|---|
| CN | 103217111 | A | * | 7/2013 | |
| CN | 203037214 | U | * | 7/2013 | |
| CN | 103557788 | A | * | 2/2014 | |
| CN | 103852011 | A | * | 6/2014 | |
| CN | 104406521 | A | * | 3/2015 | |
| CN | 104748685 | A | * | 7/2015 | |
| CN | 103557788 | B | * | 10/2015 | |
| CN | 103217111 | B | * | 1/2016 | |
| CN | 105300295 | A | * | 2/2016 | G01B 11/02 |
| CN | 105416097 | A | * | 3/2016 | |
| CN | 105651498 | A | * | 6/2016 | B60B 27/0068 |
| CN | 105681735 | A | * | 6/2016 | |
| CN | 106537084 | A | * | 3/2017 | B61L 15/0072 |
| CN | 206019649 | U | * | 3/2017 | |
| CN | 106997048 | A | * | 8/2017 | G01D 21/02 |
| CN | 105416097 | B | * | 9/2017 | |
| CN | 105300295 | B | * | 11/2017 | G01B 11/02 |
| CN | 207133431 | U | * | 3/2018 | |
| CN | 108594247 | A | * | 9/2018 | |
| CN | 109373988 | A | * | 2/2019 | G01C 15/002 |
| CN | 208921129 | U | * | 5/2019 | G01C 15/002 |
| CN | 110207597 | A | * | 9/2019 | |
| CN | 114511635 | A | * | 5/2022 | |
| CN | 115014203 | A | * | 9/2022 | |
| CN | 109537977 | B | * | 8/2023 | E04H 12/20 |
| CN | 114754673 | B | * | 9/2023 | G01B 11/002 |
| CN | 116679313 | A | * | 9/2023 | |
| CN | 116994226 | A | * | 11/2023 | |
| DE | 4404440 | A1 | * | 8/1995 | B60M 1/28 |
| DE | 102013217160 | B3 | * | 2/2015 | G01B 11/24 |
| EP | 2843361 | A1 | * | 3/2015 | G01B 11/24 |
| EP | 2966400 | A1 | * | 1/2016 | B60M 1/28 |
| EP | 3025926 | A1 | * | 6/2016 | B60B 27/0068 |
| EP | 2966400 | A4 | * | 12/2016 | B60M 1/28 |
| EP | 2966400 | B1 | * | 3/2018 | B60M 1/28 |
| EP | 2843361 | B1 | * | 11/2018 | G01B 11/24 |
| FR | 3120696 | A1 | * | 9/2022 | |
| GB | 2542115 | A | * | 3/2017 | B61K 9/08 |
| JP | 3891730 | B2 | * | 3/2007 | |
| JP | 2015014460 | A | * | 1/2015 | |
| JP | 2015178979 | A | * | 10/2015 | |
| JP | 6669294 | B1 | * | 3/2020 | B60L 5/26 |
| WO | WO-02077569 | A1 | * | 10/2002 | B60M 1/28 |
| WO | WO-2014136976 | A1 | * | 9/2014 | B60M 1/28 |
| WO | WO-2016046109 | A1 | * | 3/2016 | B60M 1/12 |
| WO | WO-2017057522 | A1 | * | 4/2017 | B60M 1/28 |
| WO | WO-2020179194 | A1 | * | 9/2020 | B60L 5/26 |
| WO | WO-2021123463 | A1 | * | 6/2021 | B60M 1/28 |

OTHER PUBLICATIONS

International Search Report and Written Opinion for Corresponding International Application No. PCT/ES2019/070857, 12 pages, Aug. 18, 2020.

* cited by examiner

```
┌─────────────────────────────────────────────────────────────────────┐
│ Solving for gauges to specific elements of the infrastructure (13)  │
└─────────────────────────────────────────────────────────────────────┘

┌──────────────────────────────────────────────────────┐
          │ Reducing the amount of points to be analysed within  │
          │ the segment by means of ROI (14)                     │
          └──────────────────────────────────────────────────────┘
                                    │
                                    ▼
          ┌──────────────────────────────────────────────────────┐
          │ Spatial grouping or clustering based on patterns of  │
          │ the points that could potentially make up part of    │
          │ the specific element to be detected (15)             │
          └──────────────────────────────────────────────────────┘
                                    │
                                    ▼
          ┌──────────────────────────────────────────────────────┐
          │ Determining the minimum distance from the source of  │
          │ coordinates defined by the reference system used by  │
          │ the infrastructure manager to the points associated  │
          │ with the pattern (16)                                │
          └──────────────────────────────────────────────────────┘
                                    │
                                    ▼
          ┌──────────────────────────────────────────────────────┐
          │ Synchronising these specific and static measurements │
          │ of minimum distances (gauges) to specific elements   │
          │ of the infrastructure with the rest of the           │
          │ parameters collected (17)                            │
          └──────────────────────────────────────────────────────┘
```

FIG. 3

METHOD FOR IN-SITU AND REAL-TIME COLLECTION AND PROCESSING OF GEOMETRIC PARAMETERS OF RAILWAY LINES

CROSS REFERENCE TO RELATED APPLICATION

This Application is a 371 of PCT/ES2019/070857 filed on Dec. 17, 2019, the contents is incorporated herein by reference.

OBJECT OF THE INVENTION

The present invention relates to a method for in-situ and real-time collection and processing of geometric parameters of railway lines, particularly but not limited to those related to the height and stagger of the contact wire in electrified lines and the gauges to specific elements of the infrastructure.

The present invention is characterised in that it combines different types of data processing according to algorithms especially combined for the method object of the invention, starting from raw data collected by sensors which record geometric parameters of the railway lines.

Therefore, the present invention falls within the railway field and particularly among the methods for measuring geometric parameters of the infrastructure.

BACKGROUND OF THE INVENTION

In the railway environment, it is necessary to control the state of the geometric parameters which define the infrastructure throughout the life cycle thereof, including the construction and operation phases. The infrastructure administrator plans inspections in order to find out the status of the facilities with a frequency that varies depending on their criteria and experience. To do so, the maintenance staff combines visual inspections with measurements made with different devices, which capture data by means of sensors with different technologies and operating principles. The sensors can be integrated into critical elements of the infrastructure itself, or be loaded onto different vehicles; typically, manually-operated carts or inspection trains/draisines.

The use of these sensors enables a measurement to be had of the geometric parameters which define the infrastructure, both those related to the track and to the railway electrification systems, as well as to know if any element external to the layout of the railway line (for example, vegetation) affects the gauges of the infrastructure or of the rolling stock, which may result in an unwanted interruption in rail services.

Regarding devices loaded onto measuring vehicles, there are different solutions known in the state of the art. Manually-operated carts generally carry sensors which offer high precision at the cost of a high initial acquisition cost, and usually include post-processing, in a laboratory, of the measurements made. In the case of inspection trains, apart from the high cost both of acquisition and operation of this type of vehicle, the huge amount of data generated in each measurement campaign is added, which hinders the in-situ and real-time processing thereof. The most widely used sensors are usually laser or LIDAR (Light Detection and Ranging) scanners, which generate a point cloud of the elements of the railway infrastructure, the geometric parameters of which are to be known. The measurement made by these sensors can be complemented by images or videos captured by high-resolution cameras, helping to recognize patterns by means of complex algorithms and methods which are often supported by techniques for deep learning and artificial intelligence. On other occasions, LIDAR systems can be dispensed with; generating a "reconstructed" point cloud by means of the aforementioned computer vision techniques. Likewise, it is usually customary to spatially correlate said measurements by means of georeferencing systems based on GNSS (Global Navigation Satellite System) receivers and inertial sensors. Occasionally, devices capable of recording environmental variables are also incorporated.

Therefore, it follows that there is a need to optimise the requirements of the sensors used and reduce the processing time of the data they collect. The motivation for this is to provide the infrastructure manager or company responsible for the construction and/or maintenance of the line (hereinafter, "infrastructure manager" will be used generically) with information in real time, which is streamlined and easily interpreted by personnel out in the field, such that the post-processing step, in the laboratory, of the measurements by a specialised technician can be avoided.

This need must be based on the construction of a robust measurement method, based on different algorithms and types of statistical processing which efficiently combine the raw data collected by the sensors in order to generate the final information of the geometric parameters that the infrastructure manager needs to know, with the required accuracy.

In this manner, by generating said optimised method, sensors with a lower resolution and with a lower intensity of data generated can be used, thereby reducing the initial acquisition and operation costs of the necessary track vehicles. The applicant of the present invention, after analysing different alternatives in sensors and algorithms, concludes that a method that can meet the aforementioned conditions must necessarily perform static processing of the point cloud. Furthermore, the infrastructure manager often prefers to avoid continuous sampling, restricting the analysis to specific points of the infrastructure.

Therefore, the object of the present invention is to respond efficiently to the aforementioned need, and to overcome the solutions currently known in the state of the art relating to the collection and processing of geometric parameters of railway lines, in a particular but non-limiting manner, height and stagger of overhead contact lines, and gauges for specific elements of the infrastructure.

The background search has yielded a series of documents essentially based on continuous measurement methods, wherein the sensors used and/or the vehicle wherein they are integrated, as well as the type of additional data recorded vary.

CN203037214U and CN103852011A both propose portable systems for measuring the height and stagger of overhead contact lines, as well as the associated measurement methods. A continuous measurement method is described, wherein a 2D LIDAR device, loaded in a trolley-type vehicle on a track, continuously records a point cloud wherein the scanning plane is perpendicular to the advance direction. Through a process for filtering, fusing and statistically processing the recorded points, the inventors ensure that the method they propose enables fast, real-time processing of the point cloud. However, the applicant of the present patent considers that the method disclosed in said documents has aspects that can be improved, and makes the following reflections:

With respect to CN203037214U, it is established that the method enables the geometric parameters of the overhead contact line to be solved in real time by means of a linear regression algorithm; however, regressions of this type applied to point clouds of a railway environment usually involve processing times of several seconds, which makes it difficult for the user in the field to see them in real time. Moreover, an average measurement error of +/−2 mm in stagger and +/−4 mm in height is ensured; however, the device with respect to which these precisions have been compared is a manually-operated laser rangefinder with a different measuring principle and operations, for which reason they should not be comparable devices.

With respect to CN103852011A, (i) in order to obtain a precision that is typically acceptable by the railway infrastructure manager (+/−1 cm), the authors establish that at least 10 scans per linear metre advanced must be ensured; this, in practice, implies a movement speed of the trolley of between 3-4 km/h, in this case depending on the greater or lesser skill of the operator in maintaining a constant sampling speed along the sampled section, and low enough to guarantee the required accuracy; (ii) the method has a pre-established movement range of 1 metre, such that the data recorded in that metre is combined into a single data point which is then further processed; it is then understood that the height and stagger information is linked to the beginning of each metre, for which reason a certain amount of accuracy can be lost when trying to know these values at specific points of the infrastructure, such as underneath the post; (iii) the method enables one contact wire to be detected per line, since this is the most frequent case in railway lines in China. However, cases with two contact wires per line could not be resolved, these being quite common in conventional lines in Europe, especially those that are electrified with direct current, such as commuter train lines.

Document CN105416097B includes a method similar to the one described in CN103852011A, but replacing the integration platform for trolley-type sensors with scaffolding of a road/rail vehicle for assembling overhead contact lines. In this manner, the measurement method adapts the methodology of CN103852011A to a case of use in the construction of an overhead contact line, but maintains the same problems (i) to (iii) already described in the previous paragraph.

Other documents known in the prior art are CN104406521A and CN104748685A; both enable geometric parameters of the overhead contact line to be continuously solved for by means of trolley-type vehicles and they use visual measurement technologies combining lasers and cameras. The use of these sensors compared to LIDAR-type sensors in railway environments has a clear disadvantage as a method: they need spotlights in order to illuminate the scene in the absence of ambient light, night-time being the most common time for maintenance tasks in which measurement campaigns with this type of equipment are scheduled. Since the spotlights must have sufficient power to illuminate a target located several metres high/away, and the space available for integration into the trolley is reduced, the number of spotlights that can be integrated is limited; for this reason, it will only be possible to focus the illumination towards a certain objective (the contact wire, the posts, etc.), thereby reducing the number of geometric parameters of the railway infrastructure that the device is able to capture and process in real time.

Finally, CN110207597A describes a method for measuring the height and stagger of the contact wire based on a LIDAR scanner specifically designed for the railway environment; these types of methods with devices designed ad-hoc limits the possibility of use in operational lines when the infrastructure manager requires carrying out long and expensive homologation processes which are difficult for the manufacturer to cover if the market volume of the equipment is reduced.

In accordance with the above, there is a need to propose a robust method, capable of treating, in real time and in-situ, the raw data collected by sensors which monitor geometric parameters of railway lines, with an optimised sampling level such that the most common minimum requirements of infrastructure managers are met.

Therefore, the object of the present invention is to propose an optimised, efficient and simple method which enables the management and processing of the data obtained from the railway infrastructure in real time. The proposal necessarily goes through a method based on static measurements, which involves stopping for several seconds at specific points of the railway line, and that processes these cases in a personalised manner according to the requirements.

DESCRIPTION OF THE INVENTION

The object of the present invention is
a method for the in-situ collection and processing of geometric parameters of railway lines which uses data generated by sensors with different technologies as a starting point. These sensors combine direct and indirect measurement methods:
  Direct measurement of the geometric track parameters. Particularly, but not limited to: track gauge, cant, inclination, distance travelled and positioning in absolute coordinates.
  Indirect measurement of geometric parameters of the infrastructure starting from the processing of point clouds generated by sensors with different technologies. In the proposed embodiment, the sensor is a 20 LIOAR (Laser Imaging Detection and Ranging) laser scanner, although the method can be adapted to process point clouds generated by other means (for example, computer vision by means of cameras). Through statistical processing and algorithms starting from these raw point clouds, geometric parameters of the railway infrastructure are finally obtained such as: height and stagger of the contact wire, pole offset and electrical insulation clearances (in electrified tracks) and gauges of the rolling stock in any type of line.
  In accordance with the foregoing, the method developed is fed by, particularly in the proposed embodiment, but not limited to, data collected by the following sensors:
  LIOAR 20 laser scanner for generating point clouds.
  IMU (Inertial Monitoring Unit) for measuring the cant and inclination of the track.
  Linear displacement transducer for measuring the track gauge and determining the central axis thereof at all times, used to reference the measurements.
  Multi-constellation GNSS receiver for georeferencing the measurements made.
  Incremental rotary encoder for accurately determining the distance travelled on the track.
The foregoing applies only to a preferred embodiment of the invention, such that any sensor capable of offering measurements of the aforementioned geometric parameters would be acceptable for the method.

In addition to these sensors, in the proposed embodiment two cameras are incorporated which take frontal and azimuthal photographs of the railway environment, facilitating the user with the possible subsequent revisions, in the laboratory, of the measurements that were taken in the field. Likewise, in order to improve the quality of the images during night-time or periods with low ambient lighting (for example, in tunnels), in the proposed embodiment, the scene is illuminated by means of several LEO lights, both frontal and azimuthal.

The sensors and devices which feed the method object of the present invention are preferably loaded on a cart-type vehicle, manually operated, such as a trolley. However, it is also common in the railway field to integrate such sensors into motorised vehicles, such as road/rail trucks, maintenance draisines or inspection trains.

In any case, said vehicle must guarantee the possibility of stopping for several seconds at specific points of the railway line in order to enable the static measurement provided for in this method. These specific points will vary depending on the requirements established by the infrastructure manager for each particular line; in most cases, next to the post (straight and curved layout) and at half-span (curved layout). As for the overhead contact line, these areas are of special interest, since it is wherein the points which have the maximum stagger (in absolute value) and the "hard" points in terms of heights are located (areas of the contact wire especially subject to wear, and therefore, susceptible to undergoing greater control in the infrastructure maintenance). As for other infrastructure elements, in each case the manager defines the specific elements to be monitored (for example, electrical insulation clearances in air-gap overlap spans, distance of the gauge from the rolling stock to the tunnel vault or to surrounding vegetation, etc.). The method enables these cases to be processed in a personalised manner according to the requirements defined in each case by the manager of the railway line.

With all of the above, the proposed method is based on the processing of point clouds in 20 cross sections or "slices", particularly but not limited to those generated by a LIDAR laser scanner. In order to record each of these slices, the field technician must stop the track vehicle wherein the aforementioned sensors are integrated at the point of interest. Therefore, the input of the method is the 20 cross section generated by launching a measurement while the equipment is parked at the point of interest (hereinafter, the "scene").

There are two complementary paths in the method depending on the geometric parameters of the railway line to be sampled:

Alternative 1: solving for height and stagger of the overhead contact line.

Alternative 2: solving for gauges to specific elements of the infrastructure. The steps of the method that alternatives 1 and 2 have in common are described below:

Determining the number of angular positions per scene necessary to solve for the specific elements of the railway infrastructure based on a study of the casuistry of these environments. This minimum number of angular positions will determine both the laser scanner model used, as well as the configuration parameters thereof (in a particular but non-limiting manner: field of view, angular resolution and beam divergence).

Determining the minimum number of passes per angular position in order to ensure the repeatability of the measurements. This value will be set by a study of the evolution of the most representative centralisation and dispersion statistics of the type of point clouds obtained in scenes of the railway environment.

Obtaining the raw coordinates of each point of the scene according to the reference system used by the sensor for generating point clouds. In a particular but non-limiting manner, in one embodiment wherein the sensor for generating point clouds is a LIDAR, a set of points for each angular position is obtained which is defined by the distance thereof from the sensor and by a parameter indicative of the power of the intensity reflected, typically, the RSSI (Received Signal Strength Indicator).

Algorithm for averaging points in each angular position, eliminating both outliers and ghost points, consisting of the following steps:

Analysing and determining the sampling distribution (or distributions) to which the data best fits.

Separating (if applicable) the sampling distributions found, and filtering (removing) any point located at a predetermined distance from the chosen centralisation statistic. Said distance is defined based on a margin of +/-"n" times the dispersion statistic selected, "n" being an integer.

Calculating the sampling distribution that best fits this new filtered sample, setting minimum quality parameters of the fit in advance.

Checking the degree of fulfilment of the quality parameters from the previous fit and, if the minimum requirements are exceeded, selecting the average value (distance) of this distribution (together with the associated RSSI thereof) as the representative point and removing the rest of the points.

Constructive offset corrections of the equipment wherein the sensor for generating the point cloud is integrated and coordinate transformation. In other words, the presentation of the measurements depending on the reference system preferred by the infrastructure manager. Typically, a Cartesian coordinate system wherein the X-axis is located on the "above rail level" (ARL), and the Y-axis starts from the axis of the track and is perpendicular to the ARL.

Once the previous steps have been carried out, in the case of alternative 1 (solving for height and stagger of the overhead contact line) being applied, the method would continue as follows:

Reducing the amount of points to be analysed within the segment, restricting the area to one region of interest (ROi) defined dynamically according to the limit requirements for height and stagger established by each infrastructure manager.

Spatial grouping or clustering of the points that could potentially make up one (or two) contact wires, using an algorithm to do so that can be set depending on the physical features and constructive limits thereof (diameter of the wire, range of heights expected over the above rail level and separation between wires in the case of lines with double contact wire). Said parameters, together with those of the laser scanner, define a minimum and maximum number of expected impacts on an object of the "contact wire" type.

Dividing the clusters from the previous step into subgroups of points that could give rise to one or two contact wires. To do so, it establishes (i) a minimum and maximum threshold of points which define the potential thereof for representing one or two contact wires, and (ii) criteria for dividing the clusters from the previous step depending on the number of points making them up.

Spatial weighting of the points contained in the subgroups from the previous step based on the parameter indicating the power of the intensity reflected, typically, the RSSI. As a result of this weighting, a point in a "virtual" position is obtained, which is weighted based on the RSSI of the original points. This algorithm enables the precision of the measurements to be refined, since for laser scanner sensors, the higher the value of the reflected intensity, the greater the precision. These virtual points are defined by the coordinates thereof referring to the track system, for which reason the X-axis will correspond to the stagger of the candidate contact wire and the Y-axis to the height.

Final filtering of virtual candidate points, selecting as contact wire or wires (in the case of lines with double contact wire) those which are the lowest and of highest stagger. With this, the height and stagger of the active contact wires can be solved for at all times, since situations can occur with the presence of more than two contact wires in one same scene (catenary section overlaps), wherein some of the wires of the scene are not in direct contact with the pantograph when the trains are circulating.

Synchronising these specific and static measurements of the height and stagger of the contact wire or wires, with the rest of the parameters collected by the auxiliary sensors, which complete the information required by the infrastructure manager.

Regarding the case of applying alternative 2 (solving for gauges to specific elements of the infrastructure), the method would maintain the steps in common for both alternatives, and would continue as follows:

Reducing the amount of points to be analysed within the segment, restricting the area to one region of interest (ROi) defined dynamically according to the geometric requirements of the specific element of the railway infrastructure to be detected in each case (pole offset, electrical insulation clearances, etc.)

Spatial grouping or clustering of the points that could potentially make up part of the specific element to be detected, based on defining patterns determined by the most representative geometric features thereof; in a particular but non-limiting manner, straight and curved ones.

Determining the minimum distance from the origin of coordinates defined by the reference system used by the infrastructure manager (typically the same one used for height and stagger of the contact wire or wires) to the points associated with a specific pattern in the previous step.

Synchronising these specific and static measurements of minimum distances (gauges) to specific elements of the infrastructure, with the rest of the parameters collected by the auxiliary sensors, which complete the information required by the infrastructure manager.

Unless otherwise indicated, all the technical and scientific elements used herein have the meaning normally understood by a person with skill in the art to which this invention pertains. In the practice of the present invention, methods and materials similar or equivalent to those described herein can be used.

Throughout the description and the claims, the word "comprises" and its variants are not intended to exclude other technical features, additions, components or steps. For those with skill in the art, other objects, advantages and features of the invention will be derived partly from the description and partly from the practice of the invention.

EXPLANATION OF THE FIGURES

In order to complement the description being made and with the object of helping to better understand the features of the invention, in accordance with a preferred practical exemplary embodiment thereof, said description is accompanied, as an integral part thereof, by a set of drawings where, in an illustrative and non-limiting manner, the following has been represented:

FIG. 3 shows the resolution of gauges to specific elements of the infrastructure (13).

PREFERRED EMBODIMENT OF THE INVENTION

Figure 1:
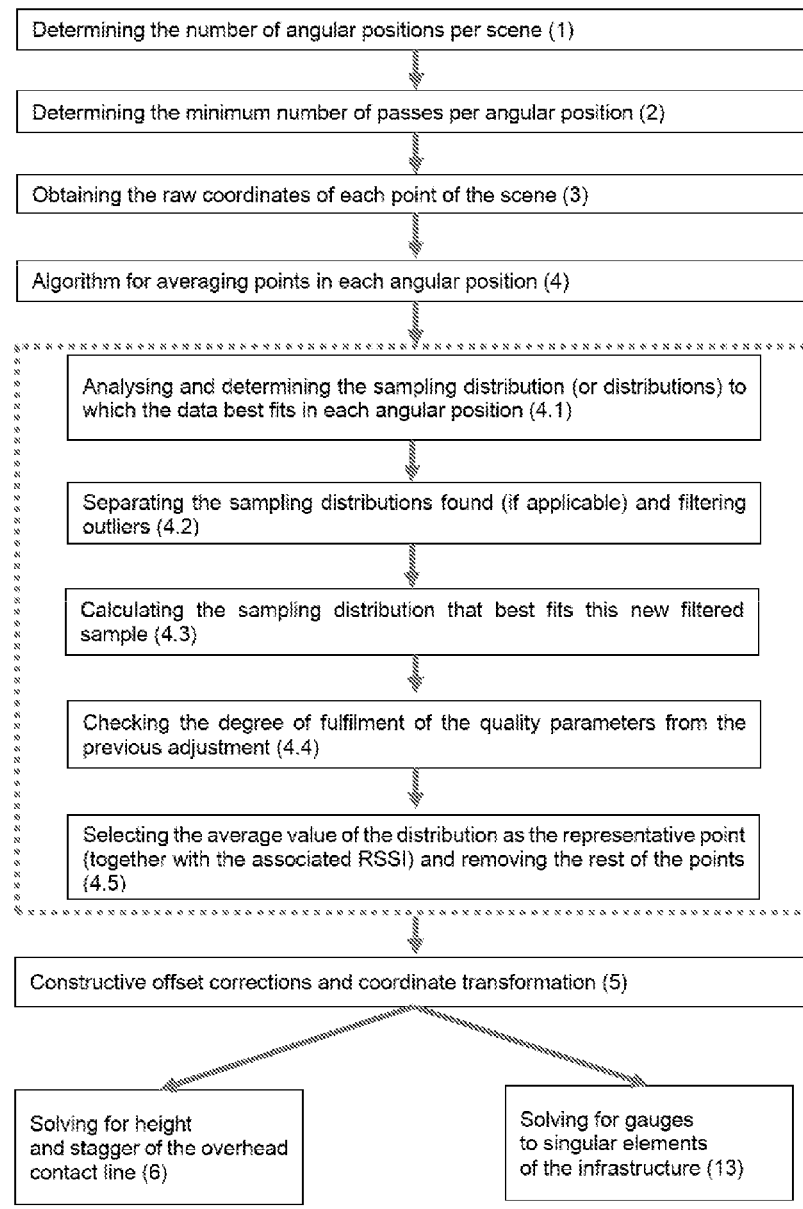
FIG. 1 shows a representation of the basic steps of the method object of the invention.

In light of the figures, a preferred embodiment of the proposed invention is described below.

The method object of the invention for in-situ and real-time collection and processing of geometric parameters comprises the following steps:

Determining the number of angular positions per scene (1) necessary to solve for the specific elements of the railway infrastructure based on a study of the casuistry of these environments. This minimum number of angular positions will determine both the laser scanner model used, as well as the configuration parameters thereof (in a particular but non-limiting manner: field of view, angular resolution and beam divergence).

Determining the minimum number of passes per angular position (2) in order to ensure the repeatability of the measurements. This value will be set by a study of the evolution of the most representative centralisation and dispersion statistics of the type of point clouds obtained in scenes of the railway environment. In a particular but non-limiting manner: average and median as centralisation statistics; standard deviation and deviation from the median as dispersion statistics.

Obtaining the raw coordinates of each point of the scene (3) according to the reference system used by the sensor for generating point clouds. In a particular but non-limiting manner, in one embodiment wherein the sensor for generating point clouds is a LIDAR, a set of points for each angular position is obtained which is defined by the distance thereof from the sensor and by a parameter indicative of the power of the intensity reflected, typically, the RSSI (Received Signal Strength Indicator).

Algorithm for averaging points in each angular position, eliminating both outliers (4) and ghost points, consisting of the following steps:

Analysing and determining the sampling distribution (or distributions) to which the data best fits in each angular position (4.1). In a particular but non-limiting manner, in one embodiment of the invention that uses a LIDAR to generate the point cloud, the samples for each angular position are fitted to a normal distribution, or to two partially-overlapping normal distributions.

Separating (if applicable) the sampling distributions found, and filtering (4.2) (removing) any point located at a predetermined distance from the chosen centralisation statistic. Said distance is defined based on a margin of +/−"n" times the dispersion statistic selected, "n" being an integer. In a particular but non-limiting manner, in one embodiment of the invention that uses a LIDAR to generate the point cloud, all the points located outside of a margin of +/−3 times the deviation calculated with respect to the median are filtered (removed).

Calculating the sampling distribution that best fits this new filtered sample (4.3), setting minimum quality parameters of the fit in advance. In a particular but non-limiting manner, the normal distribution with better fit.

Checking the degree of fulfilment of the quality parameters from the previous fit (4.4) and, if the minimum requirements are exceeded, selecting the average value (distance) of this distribution (together with the associated RSSI thereof) and removing the rest of the points (4.5).

Constructive offset corrections of the equipment wherein the sensor for generating the point cloud is integrated, and coordinate transformation (5). In other words, the presentation of the measurements depending on the reference system preferred by the infrastructure manager. Typically, a Cartesian coordinate system wherein the X-axis is located on the above rail level (ARL), and the Y-axis starts from the axis of the track and is perpendicular to the ARL.

Figure 2:
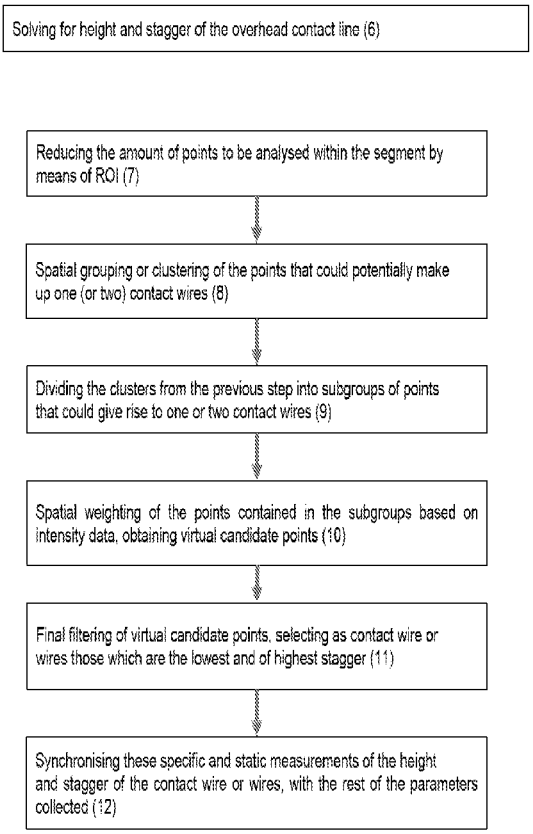
FIG. 2 shows a diagram with the steps that are carried out to solve for the height and stagger of an overhead contact line (6).

Once the previous steps have been carried out, in the case of alternative 1 (solving for height and stagger of the overhead contact line (6)), the method would continue as follows, as shown in FIG. 2:

Reducing the amount of points to be analysed within the segment (7), restricting the area to one region of interest (ROi) defined dynamically according to the limit requirements for height and stagger established by each infrastructure manager.

Spatial grouping or clustering of the points that could potentially make up one (or two) contact wires (8), using an algorithm to do so that can be set depending on the physical features and constructive limits thereof (diameter of the wire, range of heights expected over the above rail level and separation between wires in the case of lines with double contact wire). Said parameters, together with those of the laser scanner, define a minimum and maximum number of expected impacts on an object of the "contact wire" type.

Dividing the clusters from the previous step into subgroups of points (9) that could give rise to one or two contact wires. To do so, it establishes (i) a minimum and maximum threshold of points which define the potential thereof for representing one or two contact wires, and (ii) criteria for dividing the clusters from the previous step depending on the number of points making them up.

Spatial weighting of the points contained in the subgroups (10) from the previous step based on the parameter indicating the power of the intensity reflected, typically, the RSSI. As a result of this weighting, a point in a "virtual" position is obtained, which is weighted based on the RSSI of the original points. This algorithm enables the precision of the measurements to be refined, since for laser scanner sensors, the higher the value of the reflected intensity, the greater the precision. These virtual points are defined by the coordinates thereof referring to the track system, for which reason the X-axis will correspond to the stagger of the candidate contact wire and the Y-axis to the height.

Final filtering of virtual candidate points (11), selecting as contact wire or wires (in the case of lines with double contact wire) those which are the lowest and of highest stagger. With this, the height and stagger of the active contact wires can be solved for at all times, since situations can occur with the presence of more than two contact wires in one same scene (catenary section overlaps), wherein some of the wires of the scene are not in direct contact with the pantograph when the trains are circulating.

Synchronising these specific and static measurements of the height and stagger of the contact wire or wires, with the rest of the parameters (12) collected by the auxiliary sensors, which complete the information required by the infrastructure manager. In a particular but non-limiting manner: kilometre mark (KM) or distance travelled since the beginning of the sampling campaign, absolute referencing of the scene by means of GNSS coordinates, track gauge, cant and inclination of the track.

Regarding the case of applying alternative 2 (solving for gauges to specific elements of the infrastructure (13)), the method would begin after the aforementioned step for transforming coordinates and applying offset corrections (5), and would continue as follows, as shown in FIG. 3.

Reducing the amount of points to be analysed within the segment (14), restricting the area to one region of interest (ROI) defined dynamically according to the geometric requirements of the specific element of the railway infrastructure to be detected in each case (pole offset, electrical insulation clearances, etc.)

Spatial grouping or clustering of the points that could potentially make up part of the specific element to be detected (15), based on defining patterns determined by the most representative geometric features thereof; in a particular but non-limiting manner, straight and curved ones.

Determining the minimum distance from the origin of coordinates defined by the reference system used by the infrastructure manager (16) (typically the same one used for height and stagger of the contact wire or wires) to the points associated with a specific pattern in the previous step.

Synchronising these specific and static measurements of minimum distances (gauges) to specific elements of the infrastructure (17), with the rest of the parameters collected by the auxiliary sensors, which complete the information required by the infrastructure manager. In a particular but non-limiting manner: kilometre mark (KM) or distance travelled since the beginning of the sampling campaign, absolute referencing of the scene by means of GNSS coordinates, track gauge, cant and inclination of the track.

Having sufficiently described the nature of the invention, as well as how to put it into practice, it must be noted that, within its essential nature, the invention may be carried out according to other embodiments differing in detail from that set out by way of example, which the protection sought would equally cover, provided that the fundamental principle thereof is not altered, changed or modified.

The invention claimed is:

1. A method for in-situ and real-time collection and processing of geometric parameters of railway lines, comprising:
   determining a minimum number of a plurality of angular positions per scene necessary, wherein the minimum number of the plurality of angular positions is dependent on both a laser scanner model used and configuration parameters thereof;
   determining a minimum number of passes per angular position;
   obtaining, by means of a laser scanner mounted on a vehicle, and with the vehicle in a stopped position, raw coordinates of each point of a scene made up by a 2D slice;
   obtaining an algorithm for averaging points in each angular position of the plurality of angular positions, eliminating both outliers and ghost points by:
      analyzing and determining a sampling distribution or distributions to which a point data fits in each angular position,
      separating the sampling distributions found, and filtering any point located at a predetermined distance from a chosen centralization statistic, wherein said predetermined distance is defined based on a margin of +/−"n" times the dispersion statistic selected, "n" being an integer,
      calculating the sampling distribution that best fits a new filtered sample, setting minimum quality parameters of the fit in advance,
      checking a degree of fulfilment of the quality parameters from the previous fit and, when minimum requirements are exceeded, selecting an average value distance of this distribution together with an associated RSSI thereof as a representative point and removing the rest of the points;
   conducting constructive offset corrections of the laser scanner generating the 2D slice, and coordinate transformation, wherein an X-axis is located on a middle rolling plane, and a Y-axis starts from the axis of the track and is perpendicular to the middle rolling plane;
   applying either steps to solve for height and stagger of an overhead contact line, or steps to solve gauges to specific elements of the infrastructure,
wherein the steps to solve for height and stagger of the overhead contact line comprises the following steps:
   reducing the amount of points to be analyzed within a segment, restricting an area to one region of interest (ROi) defined dynamically according to limit requirements for height and stagger;
   spatial grouping or clustering of the points that make up one or two contact wires, using an algorithm to do so that can be set depending on the physical features and constructive limits thereof;
   dividing the clusters from the previous step into subgroups of points that give rise to one or two contact wires, and establishing (i) a minimum and maximum threshold of points which define the potential thereof for representing one or two contact wires, and (ii) criteria for dividing the clusters from the previous step depending on the number of points making them up;
   spatial weighing of the points contained in the subgroups from the previous step based on the parameter indicating the power of the intensity reflected, and as a result, a point in a "virtual" position is obtained, which is weighted based on the RSSI of the original points;
   final filtering of virtual candidate points, selecting as contact wire or wires in the case of lines with double contact wire, those of lowest and of highest stagger;
   synchronizing these specific and static measurements of the height and stagger of the contact wire or wires, with a rest of the parameters collected by auxiliary sensors, and
wherein the steps to solve for gauges to specific elements of the infrastructure comprises the following steps of:
   reducing the amount of points to be analyzed within a railway line segment, restricting the area to one region of interest (ROI) defined dynamically according to geometric requirements of the specific element of the railway infrastructure;
   spatial grouping or clustering of points that could potentially make up part of the specific element;
   determining a minimum distance from an origin of coordinates of a reference system;
   synchronizing these specific and static measurements of minimum distances to specific elements of the infrastructure, with the rest of the parameters collected by the auxiliary sensors.

2. The method for in-situ and real-time collection and processing of geometric parameters of railway lines according to claim 1, wherein in the step of obtaining the raw coordinates of each point of the scene, when the sensor for generating point clouds is a LIDAR, a set of points for each angular position is obtained which is defined by a distance thereof from the sensor and by a parameter indicative of the power of the intensity reflected, such as the RSSI (Received Signal Strength Indicator).

3. The method for in-situ and real-time collection and processing of geometric parameters of railway lines according to claim 1, wherein in the step of analyzing the distribution of the data in each angular position and determining the sampling distribution to which the point data fit, when a LIDAR is used to generate the point cloud, the samples for each angular position are fitted to a normal distribution, or to two partially-overlapping normal distributions.

4. The method for in-situ and real-time collection and processing of geometric parameters of railway lines according to claim 1, wherein in the step of separating the sampling distributions found, and filtering any point located at a predetermined distance from the chosen centralization statistic, when a LIDAR is used to generate the point cloud, points located outside of a margin of +/−3 times the deviation calculated with respect to the median are filtered.

5. The method for in-situ and real-time collection and processing of geometric parameters of railway lines according to claim 1, wherein in the step of calculating the sampling distribution to which this new filtered sample fits, a normal distribution is used.

6. The method for in-situ and real-time collection and processing of geometric parameters of railway lines according to claim 1, wherein in the step of synchronizing the specific and static measurements of the height and stagger of the contact wire or wires, with the parameters collected by the auxiliary sensors, the parameters are: kilometer mark (KM) or distance travelled since the beginning of the sampling campaign, absolute referencing of the scene by means of GNSS coordinates, track gauge, cant and inclination of the track.

7. The method for in-situ and real-time collection and processing of geometric parameters of railway lines according to claim 1, wherein in the step of synchronizing the specific and static measurements of minimum distances to specific elements of the infrastructure, with the parameters collected by the auxiliary sensors, the parameters are: kilometer mark (KM) or distance travelled since the beginning of the sampling campaign, absolute referencing of the scene by means of GNSS coordinates, track gauge, cant and inclination of the track.

* * * * *